United States Patent
Park et al.

(10) Patent No.: US 7,028,702 B2
(45) Date of Patent: Apr. 18, 2006

(54) AUTOMATIC WATER PRESSURE CONTROL VALVE BALANCING TEMPERATURE OF MIXED WATER

(75) Inventors: Kwang-Jin Park, Seoul (KR); Jae-Ik Jang, Seoul (KR)

(73) Assignee: Asia Union Co., Ltd., Gyung Gi-Do (KR)

( * ) Notice: Subject to any disclaimer, the term of this patent is extended or adjusted under 35 U.S.C. 154(b) by 271 days.

(21) Appl. No.: 10/603,329

(22) Filed: Jun. 25, 2003

(65) Prior Publication Data

US 2005/0072466 A1    Apr. 7, 2005

(30) Foreign Application Priority Data

Nov. 11, 2002  (KR) ................... 20-2002-0033619
Apr. 14, 2003  (KR) ................... 20-2003-0011434

(51) Int. Cl.
*G05D 11/16*   (2006.01)
(52) U.S. Cl. ........................ 137/98; 137/536; 251/64
(58) Field of Classification Search ............... 137/98, 137/100, 607, 536; 251/64
See application file for complete search history.

(56) References Cited

U.S. PATENT DOCUMENTS

| | | | |
|---|---|---|---|
| 2,930,401 A * | 3/1960 | Cowan ..................... 137/540 |
| 4,116,575 A | 9/1978 | Nakatogawa .............. 403/265 |
| 4,926,897 A | 5/1990 | Perrott ....................... 137/98 |
| 5,174,327 A * | 12/1992 | Truax et al. ................ 137/469 |
| 5,441,075 A * | 8/1995 | Clare ....................... 137/454.6 |
| 5,553,829 A * | 9/1996 | Hemsen ................. 251/129.21 |
| 6,032,925 A * | 3/2000 | Izuo et al. .............. 251/129.17 |
| 6,095,176 A | 8/2000 | Yang ........................... 137/98 |
| 6,138,705 A | 10/2000 | Chen ........................... 137/98 |
| 6,352,085 B1 | 3/2002 | Morita et al. ........... 137/516.27 |
| 6,446,655 B1 * | 9/2002 | Chang ........................ 137/100 |

* cited by examiner

*Primary Examiner*—Stephen M. Hepperle
(74) *Attorney, Agent, or Firm*—Jordan and Hamburg LLP (57) ABSTRACT

The present invention discloses an automatic water pressure control valve balancing the temperature of mixed water, eliminating a cylinder enclosing the pressure control piston and multiple seal rings, to reduce the number of parts and to minimize the production costs of the automatic water pressure control valve, and a second automatic water pressure control valve simplifying the structure of the piston within the cylinder to enhance productivity of the automatic water pressure control valve, and comprising additionally the backflow cutoff valves in each of the hot water outlet and the cold water outlet to prevent back flows of water. Therefore, initial control of water pressure is easy because the piston is always placed in the center of the cylinder while water doesn't flow.

3 Claims, 9 Drawing Sheets

FIG. 1

PRIOR ART

AUTOMATIC WATER PRESSURE CONTROL VALVE BALANCING TEMPERATURE OF MIXED WATER

BACKGROUND OF THE INVENTION

The present invention relates to a pressure control valve of fluid, such as hot water or cold water, and more particularly, to an automatic water pressure control valve without a cylinder unit enclosing a water pressure control piston, regulating the quantity of water flow automatically according to the pressure of cold water or hot water. Therefore, production costs of the automatic water pressure control valve is reduced, and heat shock, generated by the sudden rapid change of the water temperature, is prevented.

Generally, at home, a hot water pipe and a cold water pipe of showers in a bathroom or of water injectors in a kitchen are connected between each other. Therefore, when hot water or cold water begins to flow in one place (a kitchen or a bathroom) suddenly, while the mixture of hot water and cold water is flowing in another place (a kitchen or a bathroom), the temperature of the mixed water in another place is changed.

In more detail, when the mixed water of a predetermined temperature is flowing in a bathroom and cold water is supplied to a kitchen suddenly, the temperature of the mixed water in the bathroom rises rapidly. In reverse, when the mixed water of a predetermined temperature is flowing in a bathroom and hot water is supplied to a kitchen suddenly, the temperature of the mixed water in the bathroom drops down rapidly. Most people have such an experience, and in some severe case, people can have "Heat Shock".

To overcome such problems, Korean Utility Model Patent No. 20-250628 by the same inventor of the present invention discloses an automatic water pressure control valve balancing the temperature of mixed water.

Figure 1:
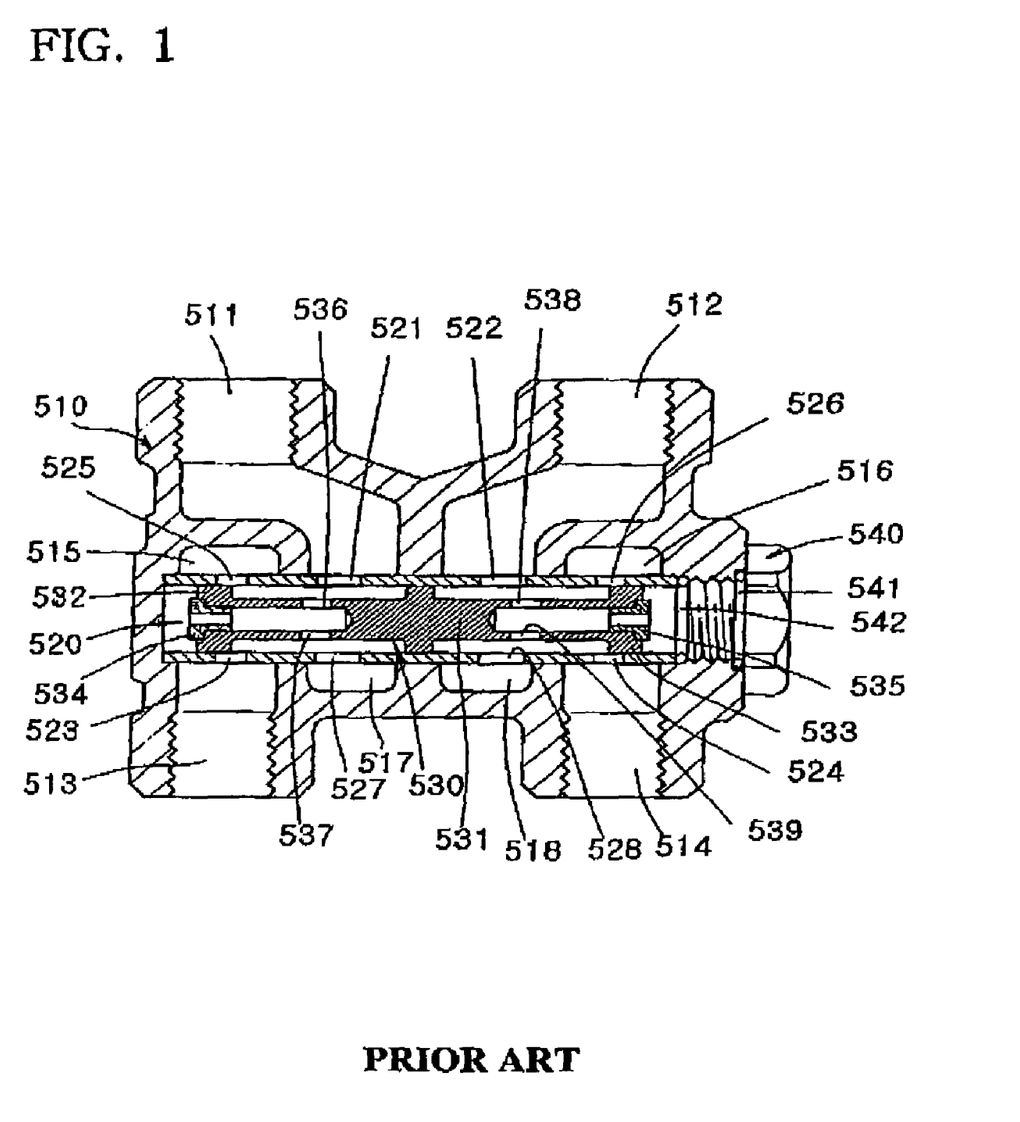
FIG. 1 is a cross sectional view of the conventional automatic water pressure control valve balancing the temperature of mixed water.

As shown in FIG. 1, the conventional automatic water pressure control valve comprises a main body 510, a cylinder 520, a piston 530, and a cap 540. The main body 510 includes a hot water inlet 511 flowing hot water and a cold water inlet 512 flowing cold water to the main body 510, wherein both water inlets 511 and 512 are bent and adjacent to each other. Furthermore, the main body 510 includes a hot water outlet 513 flowing hot water to the outside and a cold water outlet 514 flowing cold water to the outside from the main body 510.

The cylinder 520, formed between the water inlets 511 and 512 and the water outlets 513 and 514, comprises a first inlet 521 connected with the hot water inlet 511, a second inlet 522 connected with the cold water inlet 512, a first outlet 523 connected with the hot water outlet 513, and a second outlet 524 connected with the cold water outlet 514.

The piston 530 comprises a center cutout 531, a first pressure unit 532, a second pressure unit 533, buffers 534 and 535, a first and second piston holes 536 and 537, a third and fourth piston holes 538 and 539. The center cutout 531 in the inside of the cylinder 520 moves horizontally and interrupts the flow of cold water or hot water. Furthermore, the first pressure unit 532 in one side of the center cutout 531 controls the flow quantity of hot water, and the second pressure unit 533 in the other side of the center cutout 531 controls the flow quantity of cold water. Additionally, a portion of each of the buffers 534 and 535 alleviating the corresponding water pressure is inserted into the corresponding inside of the first and second pressure units 532 and 533. The first and second piston holes 536 and 537 between the center cutout 531 and the first pressure unit 532 are flow paths of hot water, and the third and fourth piston holes 538 and 539 between the center cutout 531 and the second pressure unit 533 are flow paths of cold water.

Furthermore, the cap 540 with two brings 541 and 542 seal the open parts of the main body 510, after the piston 530 is inserted into the cylinder 520.

Additionally, a first cavity 515 is formed in one side of the hot water inlet 511 and a second cavity 516 is formed in one side of the cold water inlet 512 of the main body 510. Similarly, a third cavity 517 is formed in one side of the hot water outlet 513 and a fourth cavity 518 is formed in one side of the cold water outlet 514. Furthermore, the cylinder 520 includes a first cavity hole 525 connected with the first cavity 515, a second cavity hole 526 connected with the second cavity 516, a third cavity hole 527 connected with the third cavity 517, and a fourth cavity hole 528 connected with the fourth cavity 518.

The function of the above described automatic water pressure control valve is illustrated in the following statement.

As shown in FIG. 1, the piston 530 is positioned in the center of the cylinder 520, when the cold water pressure is the same with the hot water pressure. Therefore, hot water flows through the hot water inlet 511 of the main body 510, the first inlet 521 of the cylinder 520, the first and second piston holes 536 and 537 of the piston 530, the first outlet 523 of the cylinder 520, and the hot water outlet 513 of the main body 510, sequentially. Similarly, cold water flows through the cold water inlet 512 of the main body 510, the second inlet 522 of the cylinder 520, the third and fourth piston holes 538 and 539 of the piston 530, the second outlet 524 of the cylinder 520, and the cold water outlet 514 of the main body 510, sequentially. In this case, the size of the first outlet 523 opened by the first pressure unit 532 is the same with the size of the second outlet 524 opened by the second pressure unit 533. Therefore, the quantity of discharged hot water is the same with the quantity of discharged cold water.

Sequentially, when the pressure of cold water rises, the pressure of cold water flowing into the cylinder 520 through the cold water inlet 512 and the second inlet 522 also rises to move the center cutout 531 of the piston 530 to the left direction. Therefore, the first pressure unit 532 of the piston 530 opens the first inlet 523 more widely to enhance the quantity of hot water flow through the hot water outlet 513, and the second pressure unit 533 closes the second inlet 524 almost to reduce the quantity of cold water flow through the cold water outlet 514. As a result, the temperature of the mixed water discharged from a shower or a water injector (not shown) connected with the hot water outlet 513 and the cold water outlet 514 is maintained constantly.

Similarly, when the pressure of hot water rises, the pressure of hot water flowing into the cylinder 520 through the hot water inlet 511 and the first inlet 521 also rises to move the center cutout 531 of the piston 530 to the right direction. Therefore, the second pressure unit 533 of the piston 530 opens the second inlet 524 more widely to enhance the quantity of cold water flow through the cold water outlet 514, and the first pressure unit 532 closes the first inlet 523 almost to reduce the quantity of hot water flow through the hot water outlet 513. As a result, the temperature of the mixed water discharged from a shower or a water injector (not shown) connected with the hot water outlet 513 and the cold water outlet 514 is maintained constantly. As described above, the movement of the piston 530 according to the pressure of hot water and cold water makes the temperature of the mixed water constant.

However, the conventional automatic water pressure control valve balancing the temperature of the mixed water moves the piston 530 within the cylinder 520 after installing the cylinder 520 in the inside of the main body 510. Therefore, the conventional control valve is complicated in structure and comprises many parts to increase production costs.

Furthermore, in the conventional control valve, hot water and cold water has to flow through a complicated flow path including so many parts, such as water inlets 511 and 512 in the man body 510, the first and second inlets 521 and 522 in the cylinder 520, the first and second piston holes 536 and 537 and the third and fourth piston holes 538 and 539 in the piston 530, the first and second outlet 523 and 524 in the cylinder 520, and water outlets 513 and 514 in the main body 510, sequentially. Therefore, the production process of the conventional control valve is too complicated. Furthermore, when water is not flowed, as shown in FIG. 1, the piston 530 within the cylinder 520 should be placed in the center of the main body 510. However, when the water pressure of a water pipe (not shown) connected with the hot water outlet 513 and with the cold water outlet 514 is not constant, backflows from the water pipe makes the piston 530 move into the one direction, left or right. Therefore, in the initial water pressure control states especially, the piston 530 often misses the proper time to balance the temperature of the mixed water.

BRIEF SUMMARY OF THE INVENTION

To overcome the above described problems, a preferred embodiment of the present invention provides an automatic water pressure control valve, balancing the temperature of mixed water, without a cylinder and multiple seal rings enclosing a piston controlling water pressure, wherein the number of parts and production costs, eventually, are reduced.

To overcome the above described problems, a second preferred embodiment of the present invention provides an automatic water pressure control valve, balancing the temperature of mixed water, simplifying the structure of a piston within a cylinder to increase productivity of the control valve of the present invention, and including backflow cutoff valves to place the piston into the center of the cylinder always, while water is not flowed, so that initial water pressure can be controlled easily.

The purpose of the present invention is to provide an automatic water pressure control valve balancing the temperature of mixed water comprising: a main body including: a hot water inlet and a cold water inlet, bent and faced each other; a piston spacer within the main body connected with the hot and the cold water inlets, wherein one end of the piston spacer has the same diameter with the other end of the piston spacer; a separation hole in the center of the piston spacer; a first spacer in one side of the piston spacer, storing a predetermined quantity of hot water; a second spacer in the other side of the piston spacer, storing a predetermined quantity of cold water; a transition opening between the piston spacer and the first spacer, having slightly smaller diameter than the piston spacer; a cap hole prolonged to the piston spacer via the second spacer to have slightly longer diameter than the piston spacer, comprising a female screw on the outer side of the second spacer and a transition step in one side of the piston spacer; a hot water outlet connected with the first spacer; and a cold water outlet connected with the second spacer; a piston, penetrating the female screw, the second spacer, and the separation hole of the main body sequentially, including: a sealing moveable only within the separation hole; a hot water tube in one side of the sealing, connected with the first spacer, including a hot water hole opened or closed selectively to the hot water inlet; and a coldwater tube in the other side of the sealing, connected with the second spacer, including a cold water hole opened or closed selectively to the cold water inlet; wherein one end of the piston is contacted with the transition opening of the piston spacer having a boundary with the first spacer; the length of the piston is slightly less than the length of the piston spacer; and the outer circumference of the sealing includes a ring groove placing a seal ring; and a cap penetrating the cap hole in one side of the main body to contact with the transition step in one side of the piston spacer, including: an inlet tube in the extremity of the cap, connected with the piston spacer; a separation hole perpendicular to the inlet tube, connected with the second spacer; a male screw in the outer circumference of the inlet tube adjacent to a cap head, corresponding to the female screw of the main body.

A further purpose of the present invention is to provide an automatic water pressure control valve balancing the temperature of mixed water of the present invention, comprising: a main body including: a hot water inlet and a cold water inlet, bent and faced each other; a piston spacer within the main body connected with the hot and the cold water inlets; a first spacer in one side of the cylinder spacer to store a predetermined quantity of hot water; a second spacer, connected with a female screw penetrating to the outside of the main body, in the other side of the cylinder spacer to store a predetermined quantity of cold water; a transition opening between the piston spacer and the first spacer; a hot water outlet connected with the first spacer; a cold water outlet connected with the second spacer; and a backflow cutoff valve in each of the hot water outlet and the cold water outlet to prevent back flows of hot or cold water; a cylinder penetrating the female screw, the second spacer sequentially, including: a first inlet connected with the hot water inlet; a second inlet connected with the cold water inlet; at least more than one seal ring in the outer circumference of the cylinder to separate completely hot water from cold water in the piston spacer; a transition step within one side of the cylinder, adjacent to the second spacer; and a screw in one side of the outer circumference of the cylinder, adjacent to the second spacer; wherein one end of the cylinder is contacted with the transition opening of the cylinder spacer having boundary with the first spacer; a piston moveable in a predetermined distance in the inside of the cylinder, including: a hot water cavity connected with the first spacer and formed in one side from the center of the piston; a cold water cavity connected with the second spacer and formed in the other side from the center of the piston; a hot water hole perpendicular to the hot water cavity, opened or closed to the first inlet of the cylinder selectively; a cold water hole perpendicular to the cold water cavity, opened or closed to the second inlet of the cylinder selectively; a first pressure unit in one side of the piston; a second pressure unit in the other side of the piston; rounds in one ends of the first and the second pressure units making the piston slide easily in the inside of the cylinder; shock absorber rings in the transition opening and the transition step to absorb the impact energy generated by the rounds; a piston seal ring in the center of the outer circumference, contacted with the cylinder tightly; wherein one end of the piston is correspondent to the transition opening and the other end of the piston is correspondent to the transition step; and a cap including: a minor screw jointed with the screw of the cylinder inserting the piston; a major screw jointed with the female screw of the main body; and a cap seal ring; wherein the cap is sealed tightly by all of the minor screw, the major screw, and the cap seal ring.

Furthermore, each of the backflow cutoff valve in the hot water outlet and in the cold water outlet of the main body to prevent back flows of hot water or cold water, further comprises: a cylindrical unit having a closed top end; an open/close unit made of rubber material in the top of the cylindrical unit to open or close the first spacer or the second spacer; multiple inlet holes to radial directions of the top side of the cylindrical unit, connected with the inside of the cylindrical unit; a guide jaw in the center of the outer circumference of the cylindrical unit, sliding up and down through the inner circumference of each of the water outlets, wherein the bottom of the cylindrical unit lifts up and down through the inner circumference of each of water conduits connected with the corresponding each of the water outlets; and a spring between the guide jaw of the cylindrical unit and each of top of the water conduits, opening the open/ close unit only in the case that the water pressure is more than a predetermined water pressure.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF THE INVENTION

Reference will now be made in detail to preferred embodiments of the present invention, example of which is illustrated in the accompanying drawings.

Figure 2:
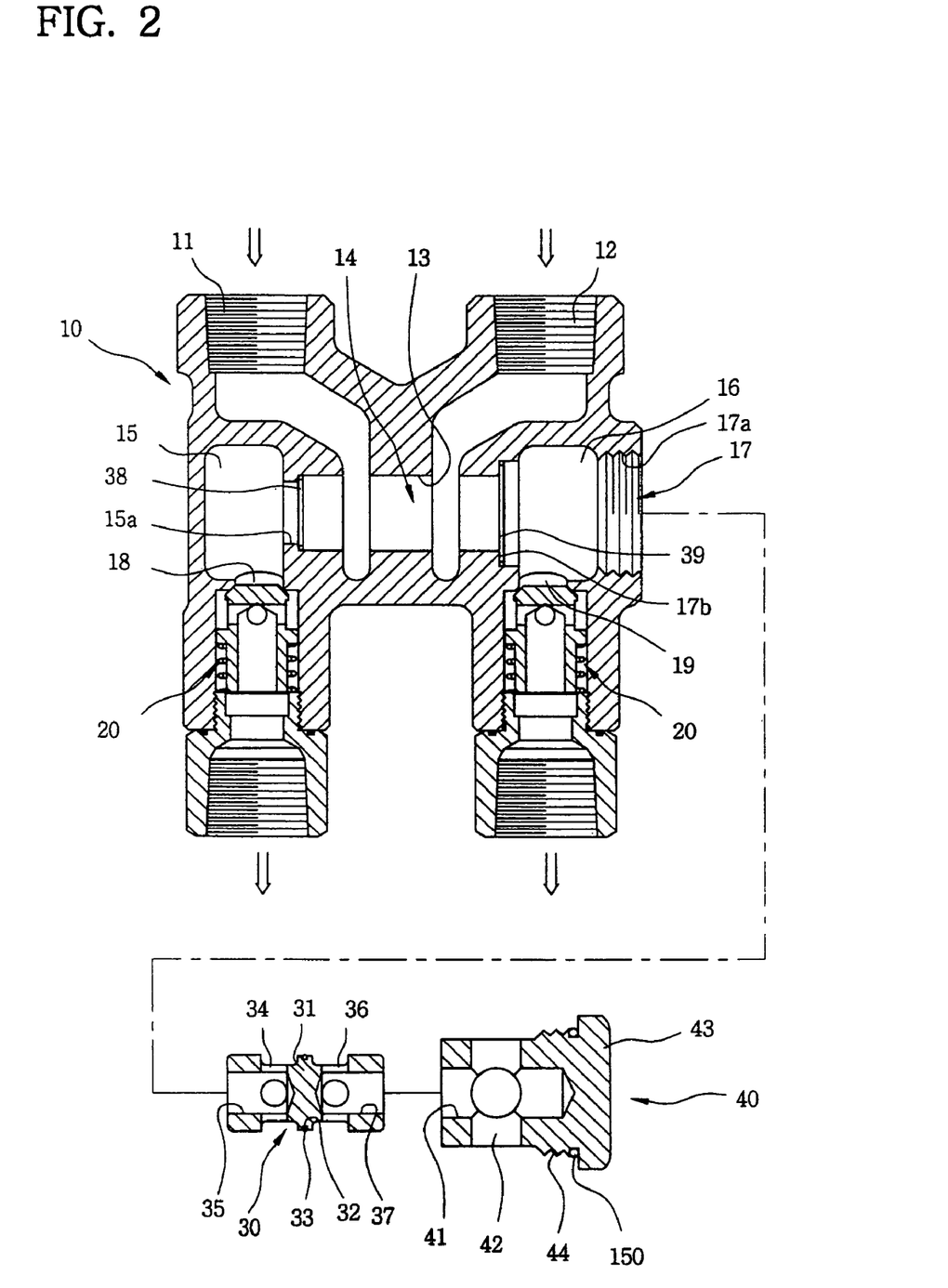
FIG. 2 is a partial cross sectional view of an automatic water pressure control valve balancing the temperature of mixed water according to the preferred embodiment of the present invention.
Figure 3:
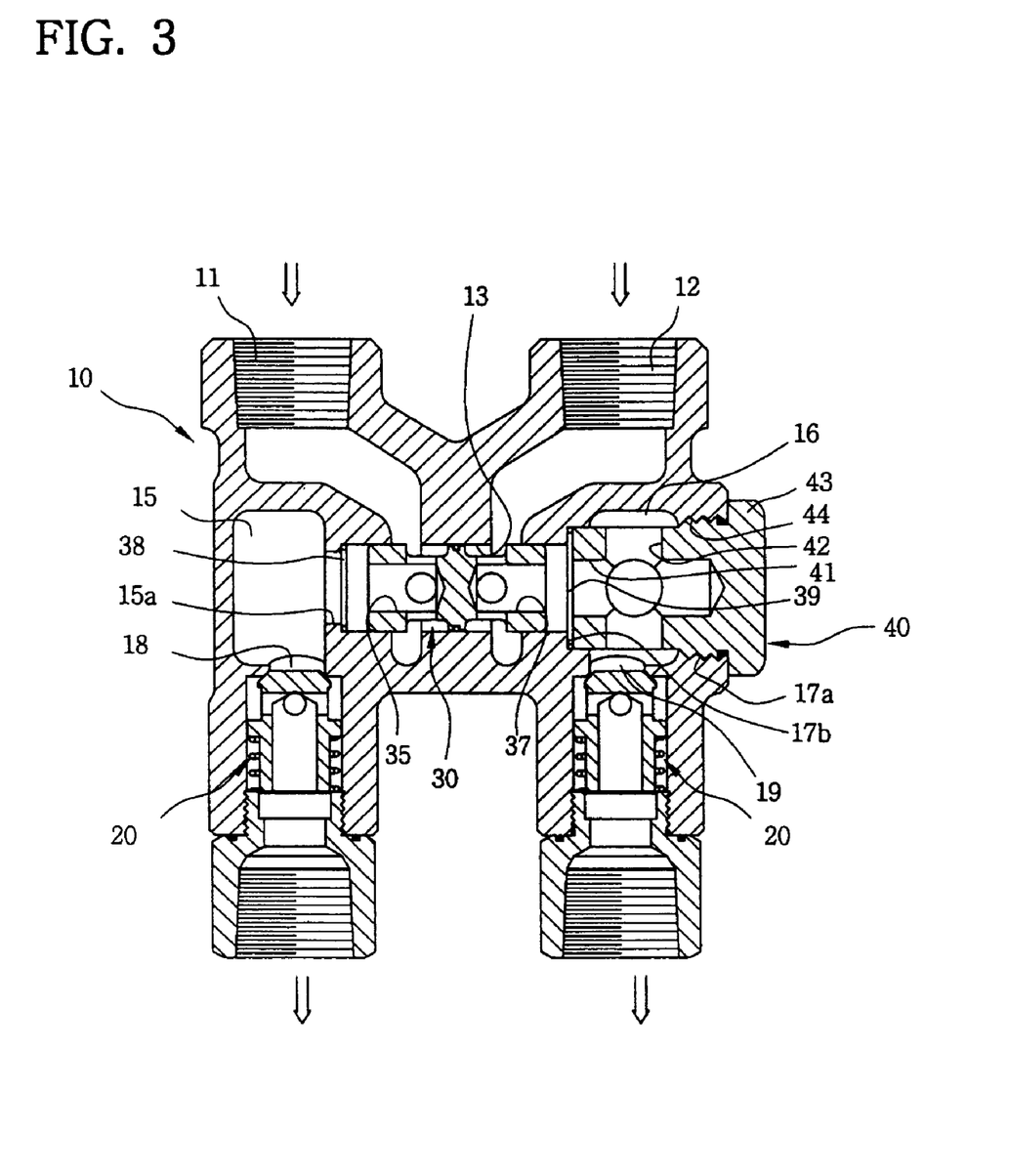
FIG. 3 is a cross sectional view illustrating an assembly states of FIG. 2.

FIG. 2 is a partial cross sectional view of an automatic water pressure control valve balancing the temperature of mixed water according to the preferred embodiment of the present invention, and FIG. 3 is a cross sectional view illustrating an assembly states of FIG. 2.

The main body 10 comprises a hot water inlet 11 and a cold water inlet 12, wherein both water inlets 11 and 12 are bent and faced each other. In the inside of the main body 10, a piston spacer 14 connects with the hot water inlet 11 and the cold water inlet 12 is formed. The diameter of one end is the same with the diameter of the other end of the piston spacer 14, and the length to one end is the same with the length to the other end of the piston spacer 14 from the center of the separation hole 13. Furthermore, the diameter of the hot water inlet 11 and of the cold water inlet 12 extending to the piston spacer 14 is narrower than the diameter of top sides of the hot water inlet 11 and of cold water inlet 12. For example, the diameter of bottom sides of the hot water inlet 11 and of cold water inlet 12 that extends to the piston spacer 14 is about half of the diameter of top sides of the hot water inlet 11 and of cold water inlet 12.

Furthermore, both ends of the piston spacer 14 include a first spacer 15 storing a predetermined quantity of hot water, and a second spacer 16 storing a predetermined quantity of cold water, respectively. Additionally, between the piston spacer 14 and the first spacer 15, a transition opening 15a having slightly smaller diameter than the piston spacer 14 is formed.

Furthermore, the outer side of the second spacer 16 comprises a cap hole 17 including a female screw 17a. The cap hole 17 is prolonged through the piston spacer 14 to the second spacer, and the diameter of the cap hole 17 is larger than the diameter of the piston spacer 14 to form a transition step 17b at one side of the piston spacer 14.

The fist spacer 15 is connected with a hot water outlet 18, and the second spacer 16 is connected with a cold water outlet 19. Furthermore, each of the hot water outlet 18 and the cold water outlet 19 includes a widely used backflow cutoff valve 20, such as check valve, to prevent backflow of water, respectively.

The piston 30 installed in the piston spacer 14 is inserted through the female screw 17a and the second spacer 16 of the main body 10, and the separation hole 13, sequentially, and one end of the piston 30 contacts with the transition opening 15a placed in the boundary between the piston spacer 14 and the first spacer 15. Furthermore, the length of the piston 30 is smaller than the length of the piston spacer 14, so that the piston 30 moves left or right within the piston spacer 14 while the center of the piston 30 remains centrally disposed in the separation hole 13.

A sealing 31 moving within the separation hole 13 only is formed in the middle of the piston 30, and the outer circumference of the sealing 31 comprises a ring groove 32 placing a seal ring 33. In one end of the sealing 31, a hot water tube 35 is formed to include a hot water hole 34, while the hot water tube 35 connects with the first spacer 15 and the hot water hole 34 selectively connects or disconnects with the hot water inlet 11. Similarly, in the other end of the sealing 31, a cold water tube 37 is formed to include a cold water hole 36, while the cold water tube 37 can connect with the second spacer 16 and the cold water hole 36 selectively connects or disconnects with the cold water inlet 12.

Additionally, it is important that the diameter of each of the hot water hole 34 and the cold water hole 36 is smaller than or equal to the diameter of each of the bottom diameters of the hot water inlet 11 and of the cold water inlet 12, correspondingly. Furthermore, one side of the transition opening 15a contacted with one end of the piston 30 includes a shock absorber ring 38 preventing an impact noise between the main body 10 and the piston 30.

The extremity of a cap 40, penetrating the cap hole 17 of one end of the main body 10 and contacting with the transition step 17b of one end of the piston spacer 14, comprises an inlet tube 41 connected with the piston spacer 14. The cap 40 also comprises multiple discharge holes 42 perpendicular to the inlet tube 41, formed in radial direction and connected with the second spacer 16. The outer circumference of the inlet tube 43 adjacent to a cap head 43 comprises a male screw 44 corresponding to the female screw 17a of the main body 10. The transition step 17b contacted with the extremity of the cap 40 includes a shock absorber ring 39 made of rubber material preventing direct contact of the piston 30 of metal material to the cap 40 of metal material.

Figure 6:
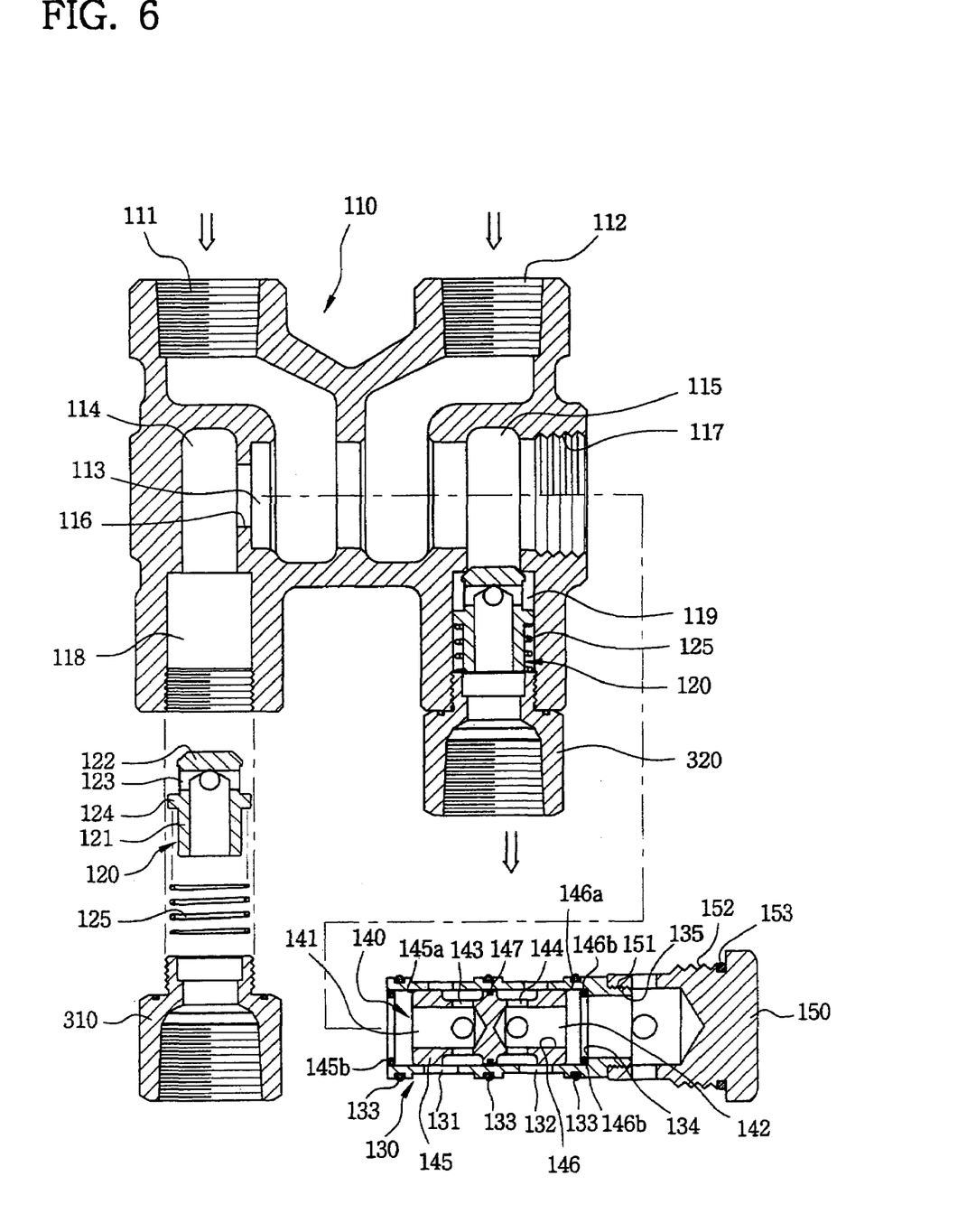
FIG. 6 is a partial disassembled cross sectional view illustrating an automatic water pressure control valve balancing the temperature of mixed water according to a second preferred embodiment of the present invention.
Figure 7:
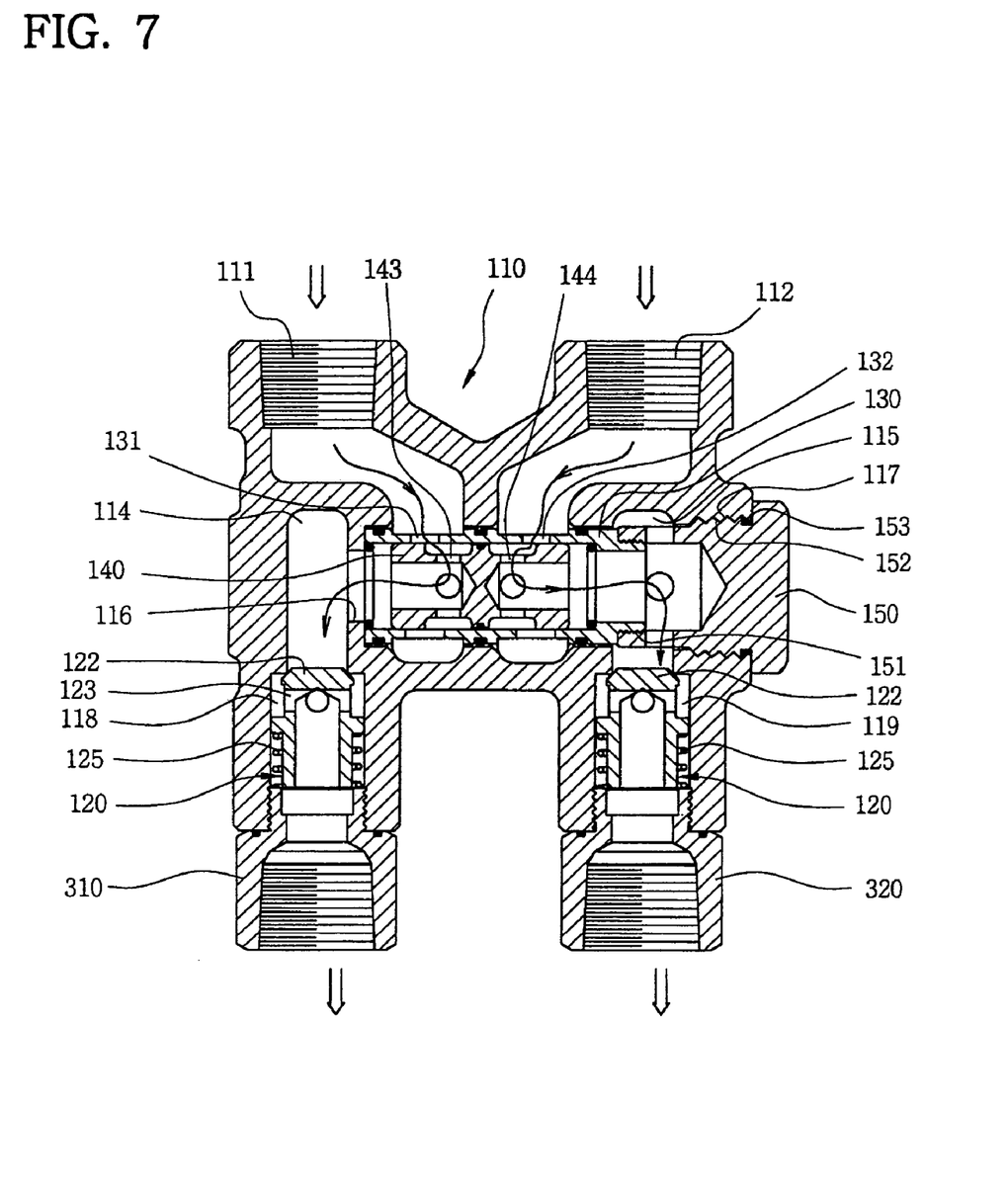
FIG. 7 is a cross sectional view of FIG. 6.

FIG. 6 is a partial disassembled cross sectional view illustrating an automatic water pressure control valve balancing the temperature of mixed water according to a second preferred embodiment of the present invention, and FIG. 7 is a cross sectional view of FIG. 6.

The main body 110 of the second automatic water pressure control valve balancing the temperature of mixed water of the present invention comprises a hot water inlet 111 and a cold water inlet 112, bent and faced each other. The inside of the main body 110 includes a cylinder spacer 113 connected with the hot water inlet 111 and the cold water inlet 112.

Each of both ends of the cylinder spacer 113 comprises a first spacer 114 storing predetermined quantity of hot water and a second spacer 115 storing predetermined quantity of cold water, respectively. Furthermore, between the cylinder spacer 113 and the first spacer 114, a transition opening 116 is formed, while the diameter of the transition opening 116 is less than the diameter of the cylinder spacer 113. The second spacer 115 connects with the female screw hole 117 penetrating the outer of the main body 110. The first spacer 114 is connected with a hot water outlet 118 linked with a hot water conduit 310 and the second spacer 115 is connected with a cold water outlet 119 linked with a cold water conduit 320.

Furthermore, each of the water outlets 118 and 119 comprises a backflow cutoff valve 120 preventing back flow of water, respectively. The backflow prevention valve 120 comprises a cylindrical unit 121, while the top end of the cylindrical unit 121 includes an open/close unit 122 made of rubber material opening or closing the first spacer 114 and the second spacer 115. Additionally, the top side of the cylindrical unit 121 includes multiple inlet holes 123 in radial direction connected with the inside of the cylindrical unit 121, and the middle of the outer circumference of the cylindrical unit 121 includes a guide jaw 124 sliding up and down through the inner circumference of the corresponding hot water outlet 118 or cold water outlet 119. The bottom of the cylindrical unit 121 is lifted up and down through the inner circumference of the water conduits 310 and 320 linked with the corresponding water outlets 118 and 119. Furthermore, a spring 125 installed between the guide jaw 124 and each of the top end of the hot and cold water conduits 310 and 320 makes the open/close unit 122 of the cylindrical unit 121 open at more than the predetermined water pressure.

A cylinder 130 installed in the cylinder spacer 113 of the main body 110 comprises a first inlet 131 linked with the hot water inlet 111, and a second inlet 132 linked with the cold water inlet 112. The outer circumference of the cylinder 130 includes multiple ring grooves (not shown), being apart in the same distance among them and isolating hot water from cold water in the cylinder spacer 113 completely, while each of seal rings 133 is installed to each of the ring grooves respectively. Furthermore, a transition step 134 is formed in one end of the inside of the cylinder 130 adjacent to the second spacer 115, and a screw 135 is formed in one side of the outer circumference adjacent to the second spacer 115.

A piston 140 is movable to a predetermined distance within the inside of the cylinder 130. One end of the piston 140 is correspondent to a transition opening 116 of the main body 110, and the other end of the piston 140 is correspondent to the transition step 134 of the cylinder 130. Furthermore, the piston 140 comprises a hot water cavity 141 linked with the first spacer 114 and a cold water cavity 142 linked with the second spacer 115, while the hot water cavity 141 and the cold water cavity 142 are isolated between each other in equal volume from the center of the piston 140. Furthermore, the piston 140 includes a hot water hole 143 perpendicular to a first inlet 131 and a cold water hole 144 perpendicular to a second inlet 132, wherein the water holes 143 and 144 opens or closes the corresponding first and second inlets 131 and 132. Each of ends of a first pressure unit 145 and of a second pressure unit 146 formed in both ends of the piston 140, includes edge rounds 145a and 146a making the piston 140 slide easily to the horizontal direction within the cylinder 130, respectively, and shock absorber rings 145b and 146b in each of the transition opening 116 and the transition step 134 to absorb impact energy by the rounds 145a and 146a. The center of the outer circumference of the piston 140 also includes a piston seal ring 147 contacting with the cylinder 130. Furthermore, each of the hot water hole 143 and the cold water hole 144 formed on the corresponding concave groove (not shown) of a predetermined depth generated in the outer circumference of the piston 140, makes wafer flows discharged from the first inlet 131 and the second inlet 132 smooth.

A cap 150 combined with the female screw 117 of the main body 110 comprises a minor screw 151 jointed with the screw 135 of the cylinder 130, a major screw 152 jointed with the female screw 117 of the main body 110, and a cap seal ring 153. Therefore, the cap 150 seals tightly the main body 110 and the cylinder 130.

Functions of the automatic water pressure control valve balancing the temperature of the mixed water according to the preferred embodiment of the present invention, is illustrated in the following.

When the pressure of the hot water is equal to the pressure of the cold water, as shown in FIG. 3, the piston 30 is placed in the center of the piston spacer 14 correctly. In other words, the sealing 31 of the piston 30 is placed in the center of the separation hole 13 correctly.

Therefore, hot water flows through the hot water inlet 11 of the main body 10, the hot water hole 34 of the piston 30, the hot water tube 35 of the piston 30, the first spacer 15 of the main body 10, and the hot water outlet 18, sequentially.

Figure 4:
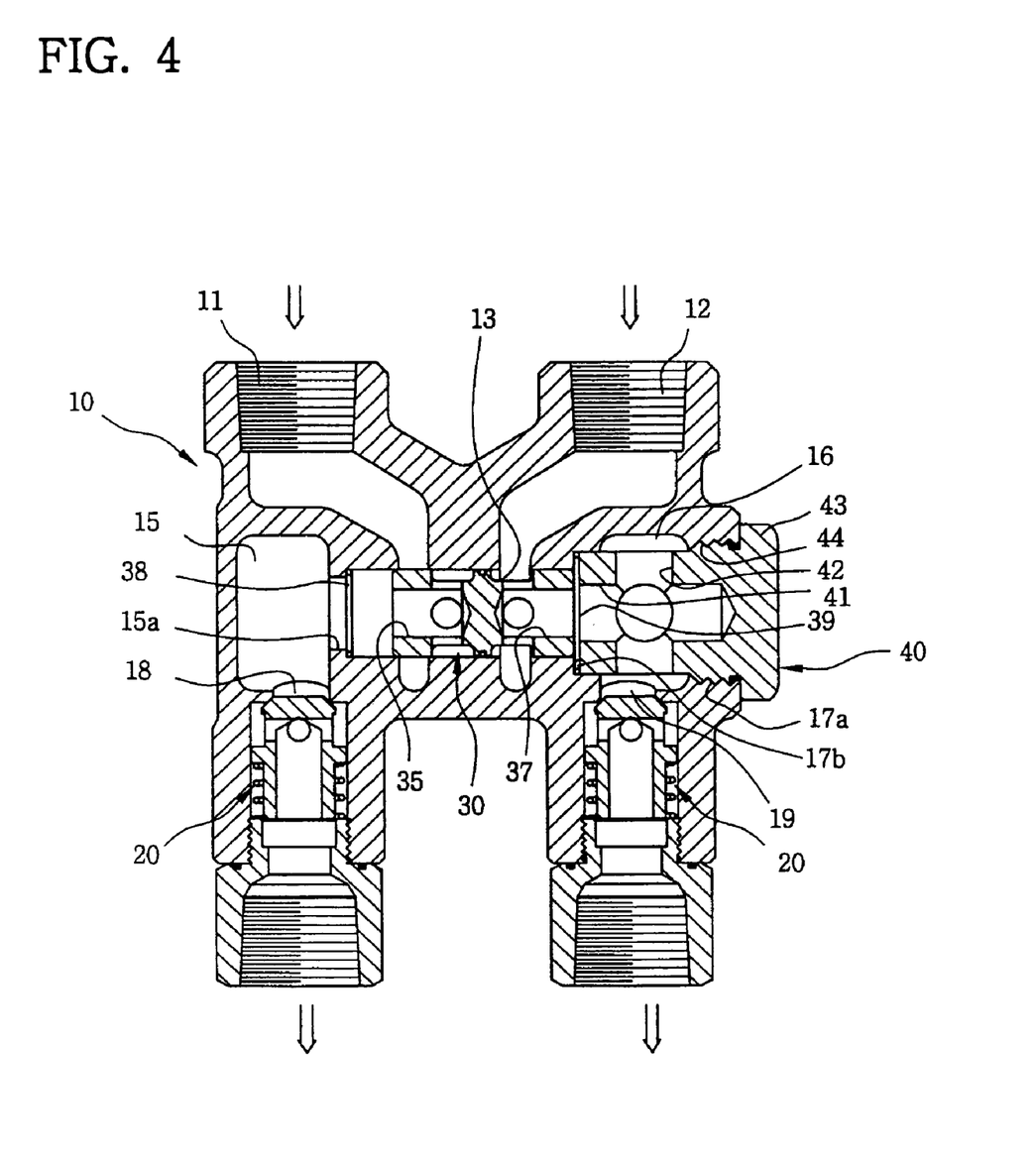
FIG. 4 is a cross sectional view illustrating operating states of the automatic water pressure control valve balancing the temperature of mixed water according to the preferred embodiment of the present invention.

As shown in FIG. 4, when the water pressure of the first spacer 15 of the main body 10 rises up, hot water in the first spacer 15 pushes the open/close unit of the backflow cutoff valve 20 down, and the hot water from the hot water outlet 18 flows into the inside of the backflow cutoff valve 20 through the inlet hole. Sequentially, the hot water flows through the hot water pipe. When the water pressure of the hot water drops, the force of restitution by the spring lifts up the open/close unit of the backflow cutoff valve 20 to close the first spacer 15. Therefore, the water pressure in the main body 10 is maintained constantly.

Similarly, cold water flows through the cold water inlet 12 of the main body 10, the cold water hole 36 of the piston 30, the second spacer 16 of the main body 10, and the hot water outlet 18, sequentially.

Figure 5:
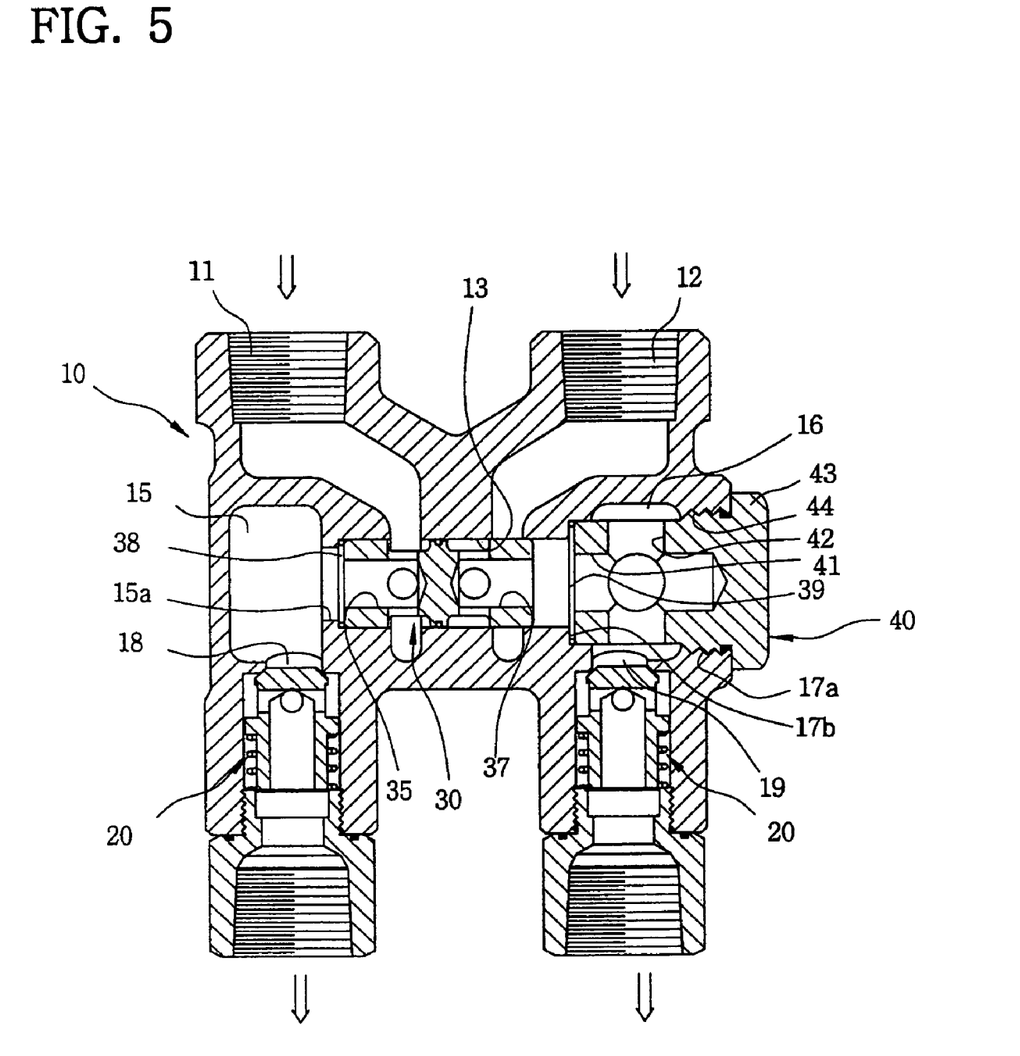
FIG. 5 is a cross sectional view illustrating further operating states of the automatic water pressure control valve balancing the temperature of mixed water according to the preferred embodiment of the present invention.

As shown in FIG. 5, when the pressure of cold water rises in the above described conditions, the pressure of cold water flowed into the inside of the piston 30 through the cold water inlet 12 also rises to push the piston 30 to the left direction. However, even though the pressure of cold water is maximized, the sealing 31 of the piston 30 is not separated from the separation hole 13, and the end of the piston 30 contacts the shock absorber ring 38 within the transition opening 15*a* to prevent impact noise between metals.

Simultaneously, when the piston 30 is moved to the left direction, not only the cold water hole 36 of the piston 30 at the bottom of the cold water inlet 12 is closed, but also the hot water hole 34 is opened in maximum to the hot water inlet 11. Therefore, the temperature of the mixed water, discharged from the shower or the water injector (not shown) and connected with the hot water outlet 18 and the cold water outlet 19, is maintained constantly.

On the contrary, when the pressure of hot water rises as shown in FIG. 4, the pressure of hot water flowed into the inside of the piston 30 through the hot water inlet 11 also rises to push the piston to the right direction. However, even though the pressure of hot water is maximized, the sealing 31 of the piston 30 is not separated from the separation hole 13, and the end of the piston 30 contacts the shock absorber ring 39 at one end of the cap 50 to prevent impact noise between metals.

Simultaneously, when the piston is moved to the right direction, not only the hot water hole 34 of the piston 30 at the bottom of the hot water inlet 11 is closed, but also the cold water hole 36 is opened in maximum to the cold water inlet 12. Therefore, the temperature of the mixed water, discharged from the shower or the water injector (not shown) and connected with the hot water outlet 18 and the cold water outlet 19, is maintained constantly.

As a result, movement of the piston 30 to the left or the right direction according to the flow pressures of hot water and of cold water maintains the temperature of the mixed water constantly.

Furthermore, functions of the automatic water pressure control valve balancing the temperature of the mixed water according to the second preferred embodiment of the present invention, is illustrated in the following.

When the pressure of the hot water is equal to the pressure of the cold water, as shown in FIG. 7, the piston 140 is placed in the center of the cylinder 130 correctly.

Therefore, hot water flows through the hot water inlet 111 of the main body 110, the first inlet 131 of the cylinder 130, the hot water hole 143 of the piston 140, the hot water cavity 141 of the piston 140, the first spacer 114 of the main body 110, and the hot water outlet 118, sequentially.

As shown in FIG. 7, when the water pressure of the first spacer 114 of the main body 110 rises, hot water in the first spacer 114 pushes the open/close unit 122 of the backflow cutoff valve 120 down, and the hot water from the hot water outlet 118 flows into the inside of the backflow cutoff valve 120 through the inlet hole 123. Sequentially, the hot water flows through the hot water conduit 310. When the water pressure of the hot water drops as shown in FIG. 7, the force of restitution by the spring 125 lifts up the open/close unit 122 of the backflow cutoff valve 120 to close the first spacer 114. Therefore, the water pressure in the main body 110 is maintained constantly.

Similarly, cold water flows through the cold water inlet 112 of the main body 110, the second inlet 132 of the cylinder 130, the cold water hole 144 of the piston 140, the cold water cavity 142 of the piston 140, the second spacer 115 of the main body 110, and the cold water outlet 119, sequentially.

As shown in FIG. 7, when the water pressure of the second spacer 115 of the main body 110 rises, cold water in the second spacer 115 pushes the open/close unit 122 of the backflow cutoff valve 120 down, and the cold water from the cold water outlet 119 flows into the inside of the backflow cutoff valve 120 through the inlet hole 123. Sequentially, the cold water flows through the cold water conduit 320. When the water pressure of the cold water drops as shown in FIG. 7, the force of restitution by the spring 125 lifts up the open/close unit 122 of the backflow cutoff valve 120 to close the second spacer 115. Therefore, the water pressure in the main body 110 is maintained constantly.

Figure 9:
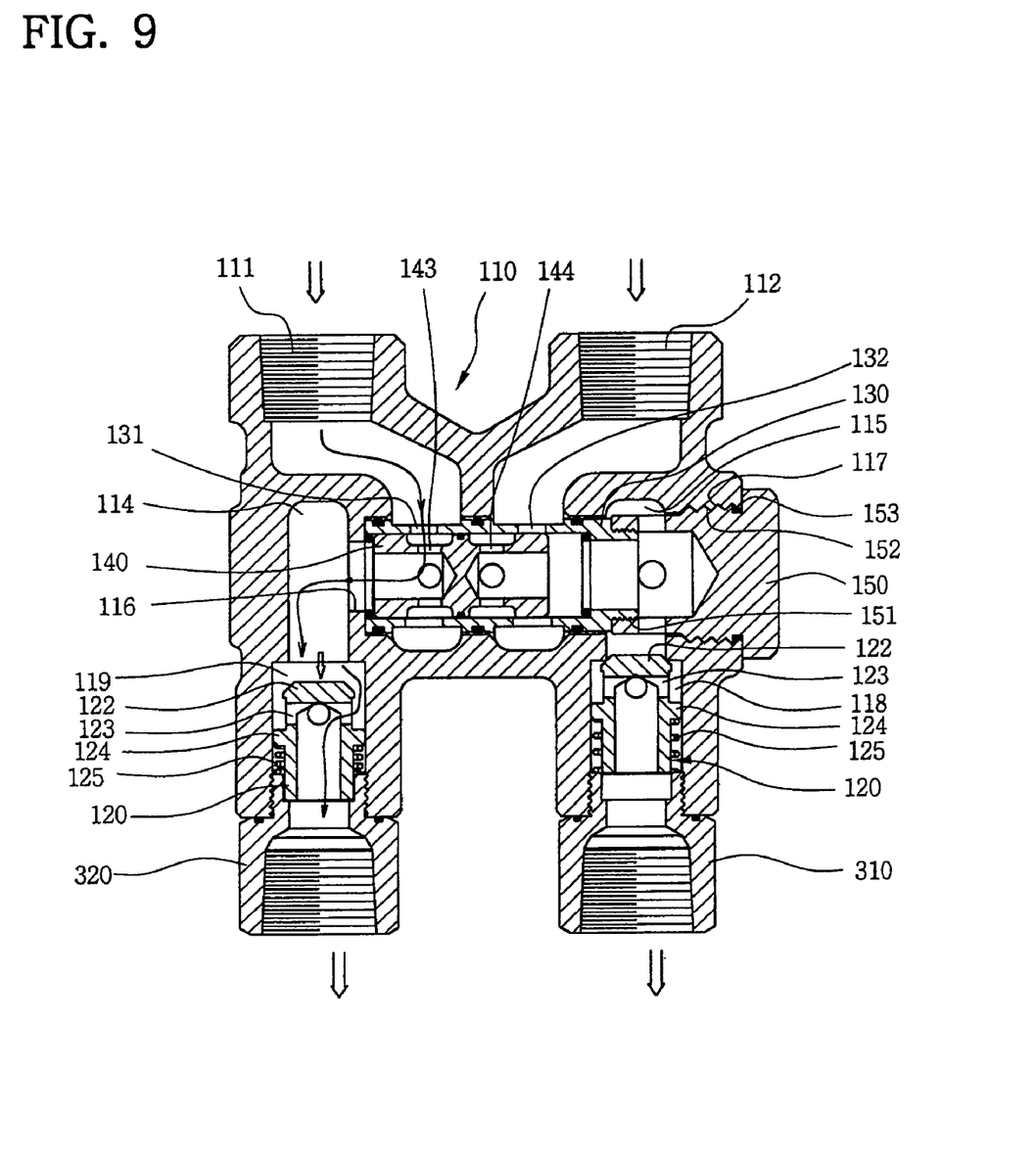
FIG. 9 is a cross sectional view illustrating further operating states of FIG. 7.

In the above described states and conditions, when the pressure of cold water rises as shown in FIG. 9, the pressure of cold water flowed into the inside of the cylinder 130 through the cold water inlet 112 and the second inlet 132 of the cylinder 130 also rises to push the piston 140 to the left direction. At this moment, when the piston 140 is slid into the left side of the cylinder 130, the second pressure unit 146 of the piston 140 contacts the shock absorber ring 146*b* in the transition step 134 of the cylinder 130 to prevent impact noise.

Therefore, the first pressure unit 145 of the piston 140 opens the first inlet 131 of the cylinder 130 in maximum to allow more quantity of hot water flow to the hot water outlet 118, and the second pressure unit 146 of the piston 140 closes the second inlet 132 almost to make less quantity of cold water flow to the cold water outlet 119. As a result, the temperature of the mixed water, discharged from the shower or the water injector (not shown) and connected with the hot water outlet 118 and the cold water outlet 119, is maintained constantly.

Figure 8:
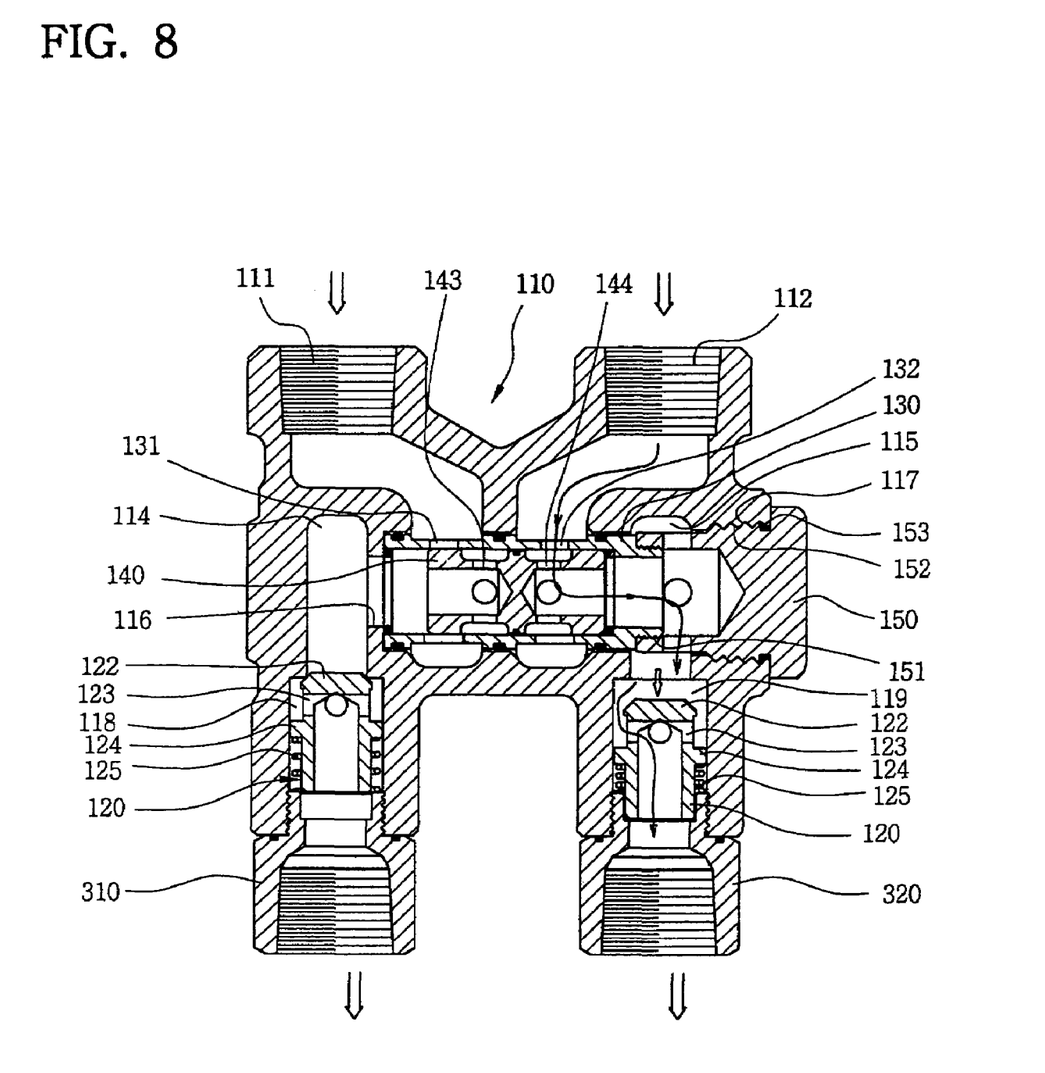
FIG. 8 is a cross sectional view illustrating operating states of FIG. 7.

On the contrary, when the pressure of hot water rises, the pressure of hot water flowed into the inside of the cylinder 130 through the hot water inlet 111 and the first inlet 131 of the cylinder 130 also rises to push the piston 140 to the right direction, as shown in FIG. 8. At this moment, when the piston 140 is slid into the right side of the cylinder 130, the first pressure unit 145 of the piston 140 contacts the shock absorber ring 146*a* in the transition opening 116 of the main body 110 to prevent impact noise.

Therefore, the second pressure unit 146 of the piston 140 opens the second inlet 132 of the cylinder 130 in maximum to allow more quantity of cold water flow to the cold water outlet 119, and the first pressure unit 145 of the piston 140 closes the first inlet 131 almost to make less quantity of hot water flow to the hot water outlet 118. As a result, the temperature of the mixed water, discharged from the shower or the water injector (not shown) and connected with the hot water outlet 118 and the cold water outlet 119, is maintained constantly.

Finally, movement of the piston 140 to the left or the right direction according to the flow pressures of hot water and of cold water maintains the temperature of the mixed water constantly.

As described in the above statements, the automatic water pressure control valve of the present invention eliminates a cylinder enclosing the pressure control piston 30 and multiple seal rings, to reduce the number of parts and to minimize the production costs of the automatic water pressure control valve.

Furthermore, the second automatic water pressure control valve of the present invention simplifies the structure of the piston 140 within the cylinder 130 to enhance productivity of the automatic water pressure control valve, and comprises additionally the backflow cutoff valves 120 to each of the hot water outlet 118 and the cold water outlet 119 to prevent back flows of water. Therefore, initial control of water pressure is easy because the piston 140 is always placed in the center of the cylinder while water doesn't flow.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic water pressure control valve balancing the temperature of mixed water of the present invention, comprising:
    a main body including:
        a hot water inlet and a cold water inlet, bent and facing each other;
        a piston spacer within the main body connected with the hot and the cold water inlets, wherein one end of the piston spacer has the same diameter with the other end of the piston spacer;
        a separation hole in the center of the piston spacer;
        a first spacer in one side of the piston spacer, storing a predetermined quantity of hot water;
        a second spacer in the other side of the piston spacer, storing a predetermined quantity of cold water;
        a transition opening between the piston spacer and the first spacer, having slightly smaller diameter than the piston spacer;
        a cap hole prolonged to the piston spacer via the second spacer to have slightly longer diameter than the piston spacer, comprising a female screw on the outer side of the second spacer and a transition step in one side of the piston spacer;
    a hot water outlet connected with the first spacer; and
    a cold water outlet connected with the second spacer;
    a piston, insertable through the female screw, the second spacer, and the separation hole of the main body sequentially, including:
        a sealing moveable only within and against the separation hole;
        a hot water tube in one side of the sealing, connected with the first spacer, including a hot water hole opened or closed selectively to the hot water inlet; and
        a coldwater tube in the other side of the sealing, connected with the second spacer, including a cold water hole opened or closed selectively to the cold water inlet;
        wherein one end of the piston is contacted with the transition opening of the piston spacer having a boundary with the first spacer;
        the length of the piston is slightly less than the length of the piston spacer; and
        the outer circumference of the sealing includes a ring groove placing a seal ring; and
    a cap penetrating the cap hole in one side of the main body to contact with the transition step in one side of the piston spacer, including:
        an inlet tube in the extremity of the cap, connected with the piston spacer;
        a separation hole perpendicular to the inlet tube, connected with the second spacer;
        a male screw in the outer circumference of the inlet tube adjacent to a cap head, corresponding to the female screw of the main body.

2. An automatic water pressure control valve balancing the temperature of mixed water of the present invention, comprising:
    a main body including:
        a hot water inlet and a cold water inlet, bent and facing each other;
        a piston spacer within the main body connected with the hot and the cold water inlets;
        a first spacer in one side of the cylinder spacer to store a predetermined quantity of hot water;
        a second spacer, connected with a female screw penetrating to the outside of the main body, in the other side of the cylinder spacer to store a predetermined quantity of cold water;
        a transition opening between the piston spacer and the first spacer;
        a hot water outlet connected with the first spacer;
        a cold water outlet connected with the second spacer; and
        a backflow cutoff valve in each of the hot water outlet and the cold water outlet to prevent back flows of hot or cold water;
    a cylinder insertable through the female screw, the second spacer sequentially, including:
        a first inlet connected with the hot water inlet;
        a second inlet connected with the cold water inlet;
        at least more than one seal ring in the outer circumference of the cylinder to separate completely hot water from cold water in the piston spacer;
    a transition step within one side of the cylinder, adjacent to the second spacer; and
    a screw in one side of the outer circumference of the cylinder, adjacent to the second spacer;
        wherein one end of the cylinder is contacted with the transition opening of the cylinder spacer having boundary with the first spacer;
    a piston moveable in a predetermined distance in the inside of the cylinder, including:
        a hot water cavity connected with the first spacer and formed in one side from the center of the piston;
        a cold water cavity connected with the second spacer and formed in the other side from the center of the piston;
        a hot water hole perpendicular to the hot water cavity, opened or closed to the first inlet of the cylinder selectively;
        a cold water hole perpendicular to the cold water cavity, opened or closed to the second inlet of the cylinder selectively;
        a first pressure unit in one side of the piston;
        a second pressure unit in the other side of the piston;
        rounds in one ends of the first and the second pressure units making the piston slide easily in the inside of the cylinder;
        shock absorber rings in the transition opening and the transition step to absorb the impact energy generated by the rounds;
        a piston seal ring in the center of the outer circumference, contacted with the cylinder tightly;
        wherein one end of the piston is correspondent to the transition opening and the other end of the piston is correspondent to the transition step; and a cap including:
  a minor screw jointed with the screw of the cylinder inserting the piston;
  a major screw jointed with the female screw of the main body; and
  a cap seal ring;
  wherein the cap is sealed tightly by all of the minor screw, the major screw, and the cap seal ring.

3. The automatic water pressure control valve according to claim 2, wherein each of the backflow cutoff valve in the hot water outlet and in the cold water outlet of the main body to prevent back flows of hot water or cold water, further comprises:
  a cylindrical unit having a closed top end;
  an open/close unit made of rubber material in the top of the cylindrical unit to open or close the first spacer or the second spacer;
  multiple inlet holes to radial directions of the top side of the cylindrical unit, connected with the inside of the cylindrical unit;
  a guide jaw in the center of the outer circumference of the cylindrical unit, sliding up and down through the inner circumference of each of the water outlets, wherein the bottom of the cylindrical unit lifts up and down through the inner circumference of each of water conduits connected with the corresponding each of the water outlets; and
  a spring between the guide jaw of the cylindrical unit and each of top of the water conduits, opening the open/close unit only in the case that the water pressure is more than a predetermined water pressure.

* * * * *